United States Patent [19]

Flamand et al.

[11] 4,241,008
[45] Dec. 23, 1980

[54] PROCESS FOR MANUFACTURE OF HOLLOW BODIES

[75] Inventors: Guy Flamand, Champforgeuil; Jean-François Gregoire, Chalon-sur-Saone, both of France

[73] Assignee: Carnaud Total Interplastic, Chalon-sur-Saone, France

[21] Appl. No.: 902,232

[22] Filed: May 2, 1978

[30] Foreign Application Priority Data

May 6, 1977 [FR] France .................. 77 13851

[51] Int. Cl.³ ............................................. B29C 17/07
[52] U.S. Cl. ..................... 264/529; 264/532; 425/530; 425/534
[58] Field of Search ............... 264/529, 530, 532, 537; 425/534, 530

[56] References Cited

U.S. PATENT DOCUMENTS

| 3,966,378 | 6/1976 | Valyi | 425/526 X |
| 4,065,246 | 12/1977 | Marcus | 425/533 X |
| 4,108,937 | 8/1978 | Martineu et al. | 264/274 X |

FOREIGN PATENT DOCUMENTS

| 2540930 | 4/1976 | Fed. Rep. of Germany | 264/97 |
| 2547995 | 5/1976 | Fed. Rep. of Germany | 264/97 |

Primary Examiner—Jan H. Silbaugh
Attorney, Agent, or Firm—Brisebois & Kruger

[57] ABSTRACT

Process for making transparent hollow bodies of terephthalate of polyethyleneglycol in which a preform is made, the preform is cooled rapidly to a temperature at least equal to the crystallization temperature, and is then rapidly expanded to obtain bi-orientation and solidification prior to substantial crystallization of the material. The preform can also be axially stretched during the operation. The apparatus for preforming the process includes a rotatable turret with mandrels, which operates to slightly expand the material on a mandrel.

1 Claim, 1 Drawing Figure

U.S. Patent    Dec. 23, 1980    4,241,008
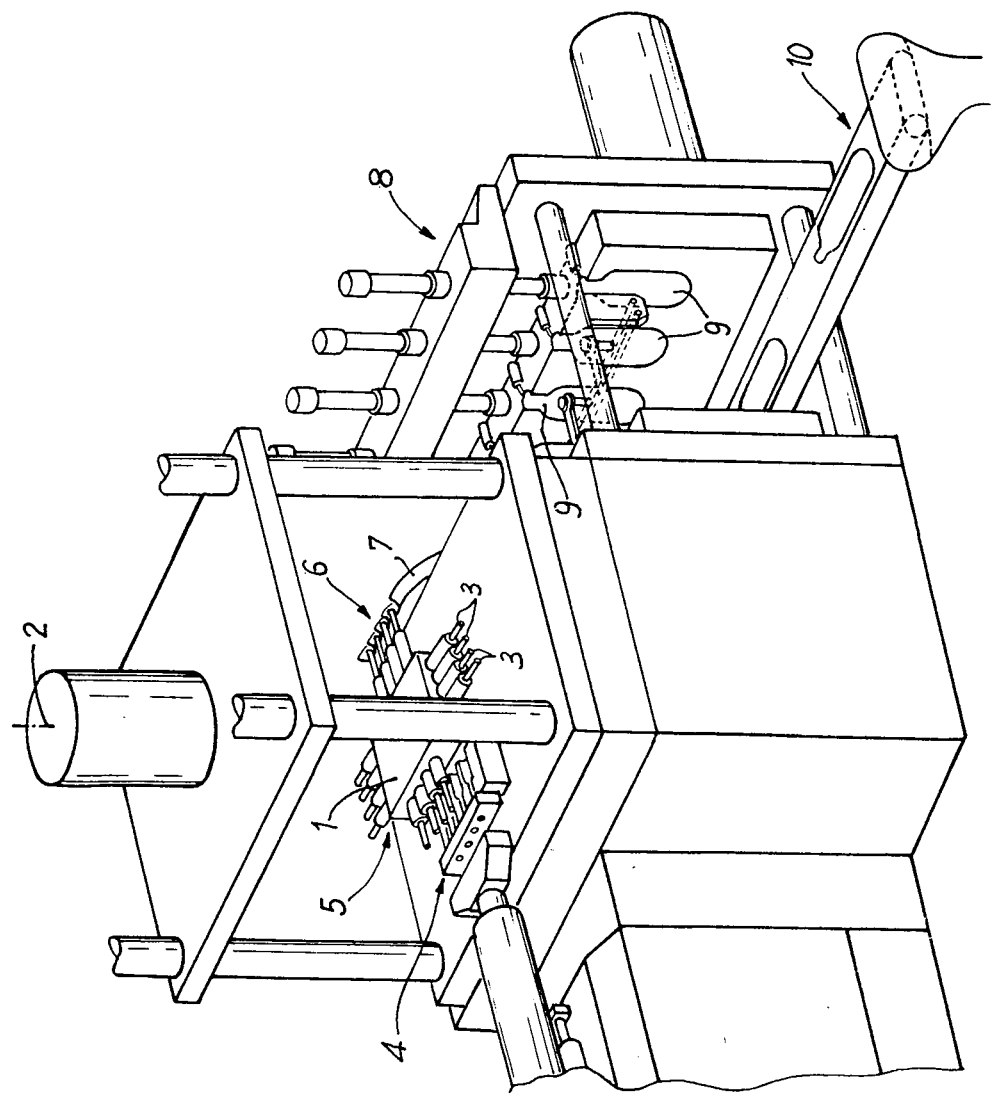

PROCESS FOR MANUFACTURE OF HOLLOW BODIES

The present invention relates to a process for manufacture of hollow bodies of terephthalate of polyethyleneglycol as well as apparatus for performing this process. The invention also relates to the hollow bodies obtained from this process.

These hollow bodies can be especially, but not exclusively flasks, bottles or other containers destined to contain liquids, especially under pressure.

It has been known for a long time how to make hollow bodies out of thermoplastic material by blowing processes. These processes consist in first of all making a parison, for example by extrusion or injection into a mold, then after having introduced the parison at a suitable temperature in a blow mold of two or several parts, to cause expansion by blowing with a fluid such as compressed air inside the blow mold. Often, the expansion by blowing is preceded by stretching or drawing to first elongate the parison.

In addition it has also been known for a long time how to achieve the expansion of hollow bodies in such a way as to attain a state of material called the bi-oriented state, a state in which there is an appreciable improvement in the mechanical strength of the material and generally, also, greater stability.

To make bodies having high strength, especially mechanical, with minimum weight, for example hollow bodies intended to contain liquids under pressure such as beers or sodas, for some time polyesters and especially terephthalate of polyethyleneglycol have been used. These materials however are difficult to work and it has been necessary to perfect special processes.

With regard to terephthalate of polyethyleneglycol which will be hereafter designated by the abbreviations PTE, the processes which have given consistent satisfaction include making an amorphous parison or preform, that is to say a parison which is cooled quickly enough to avoid the appearance of a substantial amount of crystallization, then after reheating this preform to a temperature near to and preferably greater than the temperature of vitreous transition, there follows expansion and the blowing in a sufficient amount to cause, in some parts at least, a bi-oriented state. Preferably the hollow body is then subjected to an operation of thermostabilization by elevation of temperature to release certain residual stresses.

The applicant has perfected this process by providing, beginning with the parison, a preform having already undergone a certain radial and possibly axial expansion, this preform being maintained in the amorphous state to be then expanded in a definitive fashion. It is thus possible to better control the changes in temperature and especially the maintenance of the material in the amorphous state and to easily adapt the entire process to different constraints, especially geometrical, required by the particular forms of hollow bodies that one wants to make.

It has also been proposed to make hollow bodies from PTE beginning with preforms at first essentially amorphous which are blown at a temperature greater than the crystallization temperature to be bi-axially stretched and crystallized. However, by this process, highly crystallized opaque hollow bodies are obtained which are not satisfactory for the sought after uses.

The requirement to pass from an amorphous preform or parison, that is, to cause sufficiently rapid cooling at the instant of the formation of the parison to avoid its crystallization, requires a certain number of operations and lengthens the time of manufacturing.

The invention remedies these disadvantages by providing a process which can manufacture easily and at great speed, hollow bodies from PTE which ultimately have a bi-oriented structure, are transparent, and are endowed with excellent mechanical strength, especially resistant to internal pressure.

The invention has as an object a manufacturing process for hollow bodies of terephthalate of polyethyleneglycol (PTE) in which a parison or preform is made which is then expanded, with preferably an axial stretching, characterized by the fact that starting preferably with a preform or parison of hot material, the latter is rapidly cooled to a temperature less than or equal to the crystallization temperature and near to this temperature as a result of which is caused, preferably with axial stretching, an expansion of the material in an amount sufficient to obtain a bi-orientation.

In a particular preferred mode of operation of the invention, especially in the case when one uses a preform obtained by injection around a core or mandrel the preform is slightly expanded before causing its bi-axial orientation.

This expansion can take place in a preform mold, particularly in such a way as to make a preform which is then transferred into a definitive blow mold, but preferably the expansion is done during the transport of the parison on its mandrel in such a way as to cause a slight separation of the parison in relation to the mandrel without this expansion taking place in a mold.

The temperature of the material at the instant of the bi-orientation is preferably greater than 60° or 70° below the crystallization temperature but it can possibly be lower. For a crystallization temperature in the order of 180° the temperature is preferably greater than 120° or 130°. In fact, it is preferable that the temperature be as elevated as possible and it can be very near to the crystallization temperature but in this case the process must be operated with particular rapidity.

The invention has numerous advantages. In addition to the improvement in cadence, it is possible to do away with stations for thermal conditioning and for reheating which are customary in known devices.

In addition, in the process of the invention there exists crystallization beginning from the moment of the bi-orientation and the crystals thus realized from fixed nodes from which the stretching can be made. In addition, and in a surprising way, there exist fewer free elastic stresses after the bi-orientation and when one wants to assure a thermofixation of the hollow bodies after blowing, this thermofixation is carried out more easily.

Finally, the hollow bodies obtained according to the invention have interesting advantages from the mechanical and physicochemical points of view associated probably with their actual amount of crystallinity but still small which combine known qualities of prior amorphous hollow bodies such as transparency, resistance to breaking, with other qualities inherent to the crystalline state, for example chemical inertness.

The amount of elongation of the material, in each of the directions, is at least equal to 1.5 and preferably greater than 2.5. Of course, it is possible according to the situation to realize quasi-complete bi-orientation of the whole of the hollow bodies, or to bi-orient only a part of them, for example the body while leaving the neck in a non bi-oriented state.

In every instance, the process according to the invention must be put into operation in a particularly rapid fashion to avoid all substantial crystallization of the material, the speed of crystallization being all the more rapid when very close to the crystallization temperature.

Preferably, the interval separating the realization of the hot preform from the operation of bi-orientation is less than 30 seconds, for example, from 10 to 12 seconds.

Consequently, it is advantageous to realize the final blowing in a mold with cold walls to obtain at the end of the expansion, or else during expansion, a sufficiently low temperature avoid all later crystallization.

Other advantages and characteristics of the invention will be apparent to the reader of the following description made as a non-limiting example and referring to the attached drawing which schematically shows an apparatus for practising the invention.

EXAMPLE 1

A terephthalate of polyethyleneglycol is used having a melting temperature of 275° C., a crystallization temperature of 176° C. and a vitreous transition temperature of 57° C.

Using a standard injection device there is formed in an injection mold around a cooled core or mandrel, a tubular preform with a closed bottom. The temperature of the plastic material at injection is between 280° and 300° C.

The duration of maintaining the preform in the mold is such that when the mold is opened, the material is at a temperature between 140° and 150° C.

The mandrel is then displaced to a separating station where a fluid such as compressed air is blown through the mandrel and a slight radial expansion of the preform is realized, the preform stays however fixed on the mandrel by its neck.

At the instant when the preform arrives in the blow mold, it is at a temperature between 120° and 130° C. One causes then an axial drawing out with an amount of elongation of 2.5 due to a rod sliding inside the mandrel and carrying along with it the end of the preform, in an already known manner. Immediately afterwards or simultaneously, the blowing proper takes place, the preform being deformed until taking the definitive shape of the mold. At the end of blowing, the temperature of the hollow body is less than the temperature of vitreous transition. Finally at a fourth station, the mandrel, which no longer supports the hollow body, has its temperature brought back to a low value, for example 30°.

One thus obtains a transparent hollow body with a small amount of crystallinity and experience shows that the residual elastic stresses are relatively low so that an eventual operation of thermofixing becomes simplified.

For the sake of example, the duration of the cycle can be the following for a preform having a wall thickness of 3.6 mm.

| (I) Duration of injection into the injection mold | 4 seconds |
|---|---|
| Change in temperature | 300 to 280° |
| Cooling and keeping at injection station | 8 seconds |
| Change in temperature | 280 to 150° |
| Transfer | 2 seconds |
| Change in temperature | 150 to 145° |
| (II) Separating and thermal conditioning | 10 seconds |
| Change in temperature | 130 to 125° |
| Transfer | 2 seconds |
| (III) Stretching-blowing | 10 seconds |
| Change in temperature | 125 to 30° |

Total duration of cycle: 36 seconds.

EXAMPLE 2

The process is practised on apparatus with three stations, which are an injection station, a stretching-blowing station, and a station for recycling the mandrels.

As in Example 1, a preform is injected on a cold mandrel and the preform is unmolded when its temperature is 180° C., slightly greater than the crystallization temperature.

The preform with a thickness of 2.5 mm., without intermediate separation, is immediately transferred, on its mandrel to the station for bi-orientation by stretching-blowing. It is drawn out and blown at a temperature between 170° and 180° C.

| (I) Time for injection in the injection mold | 3 seconds |
|---|---|
| Change in temperature | 300 to 280° |
| Cooling and maintenance at injection station | 7 seconds |
| Change in temperature | 280 to 180° |
| Transfer | 2 seconds |
| Change in temperature | 180 to 170° |
| (II) Stretching-blowing for bi-orientation | 8 seconds |
| Change in temperature | 170 to 30° |

Total duration of cycle: 20 seconds

At the recycling station, the temperature of the mandrels is brought back to 6°.

EXAMPLE 3

A terephthalate of polyethylene with high viscosity is used, having the following characteristics:

| Melting temperature | 257° C. |
|---|---|
| Crystallization temperature | 180° C. |
| Temperature of vitreous transition | 57° C. |

An extruder delivers a tubular parison at a temperature of 285° C. This parison is pressure charged into a preform mold and deformed by a compressible fluid until taking the shape of the mold. The duration of this step is 8 seconds. The thickness of the rough-shape is 2.5 mm. It is unmolded at a temperature of 170° and transferred by known means, to the bi-orientation station in 2 seconds. Having a temperature of 165°, it is then axially drawn out by mechanical means, then blown, both in 10 seconds. The total duration of the cycle is 20 seconds and the final temperature is 30°.

Of course the values indicated in the examples can be different according to the characteristics of the material used or the thickness of the materials, especially because preforms or parisons with thinner walls can be cooled more rapidly.

Generally speaking, it is desirable to work at an elevated temperature, very near the crystallization temperature, it being understood that the more elevated the temperature, the more rapidly the cycle must be carried out.

The process according to the invention can, for example, be put into operation by using apparatus shown in the drawing in which there is shown element 1 rotatable around a vertical axis 2 in steps of 90°. Each face of the element has a set of four horizontal parallel mandrels 3. Each set proceeds successively, and step by step, in front of a molding station 4 comprising an injection mold with four mold cavities and means to introduce the plastic material into the mold cavities around the mandrels. Preferably means for cooling the mandrels and the mold cavities are provided.

The mandrels then pass to a station displaced by 90°, designated generally by 5. When they are immobilized at this station, a slight blowing of fluid under pressure is carried out through the interior of the mandrel, which contributes to cause a separation of the parison in relation to the mandrel. This separation is preferably such that it produces a clearance in the order of 0.6 mm. By a new rotation of 90° the four mandrels are brought to a transfer station 6 having multiple channels 7 and appropriate means for expelling the parisons toward the channels which conduct them directly into a molding station 8 comprising a four cavity mold 9. The mold, in the example described, includes two parts, each having four half-cavities, and means for blowing through the neck. The blowing is carried out according to an already known technique following which the finally shaped hollow bodies are unmolded and transferred by evacuation means 10.

Of course, in variations, the final multi-cavity blow mold can be disposed in such a way as to be fed directly by the mandrels, the final blowing taking place then through the mandrels, just as the axial drawing out can take place by a sliding rod, in a known manner, through a mandrel or else by a movement of the mold. However, in this latter case, it is possible to only provide a single mandrel instead of four, without separating these dies sufficiently to provide room for the blow molds.

Although the invention has been described using particular embodiments it is of course understood that the embodiments are in no way limiting and various modifications in form or in material can be made without going beyond either its scope or its intent.

We claim:

1. A process for making hollow transparent bodies of polyethyleneglycol terephthalate, comprising the steps of:
   (a) forming a blank in the form of a parison or preform by injecting polyethyleneglycol terephthalate around a cooled mandrel in a first mold;
   (b) rapidly cooling the blank to a temperature less than or equal to the crystallization temperature of the material and above its vitreous transition temperature;
   (c) separating the blank from the first mold;
   (d) subjecting said blank while free of the confines of a mold and while supported only by said mandrel to a small radial and/or axial expansion to cause a slight separation of the blank with regard to the mandrel;
   (e) expelling said slightly expanded blank from the mandrel and into a channel which conducts the blank directly into a second mold; and
   (f) rapidly expanding said blank in said second mold to expand said blank axially and/or radially to an extent sufficient to obtain bi-orientation and hardening before substantial crystallization of the material occurs.

* * * * *